(12) United States Patent
Smith

(10) Patent No.: US 11,054,983 B2
(45) Date of Patent: Jul. 6, 2021

(54) GESTURAL TOUCH INTERFACE

(71) Applicant: NCR Corporation, Atlanta, GA (US)

(72) Inventor: Andrew William Douglas Smith, Dundee (GB)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 16/284,100

(22) Filed: Feb. 25, 2019

(65) Prior Publication Data
US 2020/0272320 A1 Aug. 27, 2020

(51) Int. Cl.
*G06F 3/048* (2013.01)
*G06F 3/0488* (2013.01)
*G06F 3/16* (2006.01)
*G06F 3/0482* (2013.01)

(52) U.S. Cl.
CPC ........ *G06F 3/04883* (2013.01); *G06F 3/0482* (2013.01); *G06F 3/167* (2013.01)

(58) Field of Classification Search
CPC .. G06F 3/167; G06F 3/04883; G06F 3/04886; G06F 9/451; G06F 2203/04808; G06F 9/542; G06F 1/1652; G06F 1/1681; G06F 3/1431; G06Q 30/00; G06Q 30/0643
See application file for complete search history.

(56) References Cited

U.S. PATENT DOCUMENTS

| | | | | |
|---|---|---|---|---|
| 10,228,833 B2* | 3/2019 | Laubach | ................. | G06F 21/31 |
| 2009/0051669 A1* | 2/2009 | Shin | ...................... | G06F 3/0236 |
| | | | | 345/173 |
| 2010/0235794 A1* | 9/2010 | Ording | .................. | G06F 3/0485 |
| | | | | 715/863 |
| 2011/0032145 A1* | 2/2011 | Hansen | .............. | G01C 21/3679 |
| | | | | 342/357.34 |
| 2011/0210917 A1* | 9/2011 | LaFave | ................. | G06F 3/0489 |
| | | | | 345/160 |
| 2012/0050179 A1* | 3/2012 | Harrow | ................... | G06F 21/36 |
| | | | | 345/173 |
| 2012/0149477 A1* | 6/2012 | Park | ..................... | G06F 3/04886 |
| | | | | 463/43 |
| 2012/0274579 A1* | 11/2012 | Ikeda | .................... | G06F 3/0486 |
| | | | | 345/173 |
| 2013/0050088 A1* | 2/2013 | Smith | ................... | G07F 19/205 |
| | | | | 345/168 |
| 2014/0331131 A1* | 11/2014 | DeSellem | .......... | G06F 3/04895 |
| | | | | 715/708 |

(Continued)

*Primary Examiner* — Linh K Pham
(74) *Attorney, Agent, or Firm* — Schwegman, Lundberg & Woessner

(57) ABSTRACT

A touch-based gesture interface is provided. An initial point of contact for a touch made on a touch-screen surface is associated with a reference value. If the initial contact is sustained before release, directional axis changes for the touch are noted until the contact is released to identify a gesture-based touch input. The directional axis changes associated with the gesture-based touch input are translated into a key entry based on the directional axis changes made relative to the reference value. If the initial contact is released with no directional axis movement/changes, the key entry is assigned to the reference value for the gesture-based touch input. In an embodiment, two successive touches with no directional axis movement/changes made within a threshold period of time is identified as a cancel key.

9 Claims, 5 Drawing Sheets

(56) References Cited

U.S. PATENT DOCUMENTS

| | | | |
|---|---|---|---|
| 2015/0022316 A1* | 1/2015 | Dixon | G08B 29/02 |
| | | | 340/5.51 |
| 2015/0253986 A1* | 9/2015 | Nakano | G06F 3/04883 |
| | | | 345/173 |
| 2015/0378599 A1* | 12/2015 | Lee | G06F 3/04883 |
| | | | 715/773 |
| 2016/0370990 A1* | 12/2016 | Sharaf | G06F 21/36 |
| 2017/0344251 A1* | 11/2017 | Hajimusa | G06F 3/04842 |
| 2018/0039402 A1* | 2/2018 | Lane | G06F 3/016 |
| 2018/0253226 A1* | 9/2018 | Hajimusa | G06F 21/83 |

* cited by examiner

GESTURAL TOUCH INTERFACE

BACKGROUND

Increasingly traditional keypads are being removed from electronic devices and terminals. Input from users is being driven by touch-screen displays, which have been miniaturized and are integrated into even the smallest of devices, such as smart watches. Elimination of keypads/keyboards removes the number of electromechanical and software components needed for producing and maintaining the devices/terminals.

However, Automated Teller Machines (ATMs) are one type of device where Personal Identification Number (PIN) keypads still have a substantial presence in the industry; this is for a variety of reasons.

First, ATMs are secure devices that allow consumers to withdraw currency while performing withdrawal transactions. Software that processes on the ATMs is often the target of thieves for obvious reasons. Thus, it is crucial that the ATM maintain a secure mechanism by which a user can securely enter a PIN for access to a user's account. Typically, an ATM PIN pad is referred to as an encrypted PIN pad that includes its own independent processor from the ATM's core processor. When a user enters a PIN, the ATM core processor cannot detect which keys are depressed for a PIN entry; rather, the processor of the encrypted PIN pad receives the PIN and encrypts the PIN with a transaction-specific hash. The encrypted PIN is forwarded from the processor of the encrypted PIN pad to the ATM core processor and the encrypted PIN is sent from the ATM to a servicing financial institution that verifies the encrypted PIN and provides back a validation to the ATM core processor. As a result, the encrypted PIN pad provides a secure mechanism by which PINs are received and processed by an ATM.

Second, ATMs are subject to a variety of governmental/agency laws and regulations. One important regulation in the United States is the American's Disability Act (ADA), which mandates that the ATM provide a mechanism by which sight-and-hearing-impaired individuals can conduct transactions on the ATM. The encrypted PIN pad typically includes raised dots on the surfaces of the keys, which can be felt by a sight-impaired individual for purposes of entering a user PIN. The ATMs also include a headphone jack for use with headphones to provide audio feedback to the sight-impaired individual during a transaction.

Thus, removal of the encrypted PIN pads has remained an elusive goal that faces many technological hurdles (security based and compliance based).

SUMMARY

In various embodiments, methods and a terminal for gestural touch interface are presented.

According to an embodiment, a method for processing a gestural touch interface on a touch display is presented. Specifically, and in one embodiment, a touch made on a touchscreen is associated with a reference value. Any changes made in directions to the touch are tracked until contact with a surface of the touchscreen is released and a gesture-based touch is recognized. A key entry value is assigned to the gesture-based touch based on the changes made in the directions, if any, relative to the reference value.

DETAILED DESCRIPTION

Figure 1A:
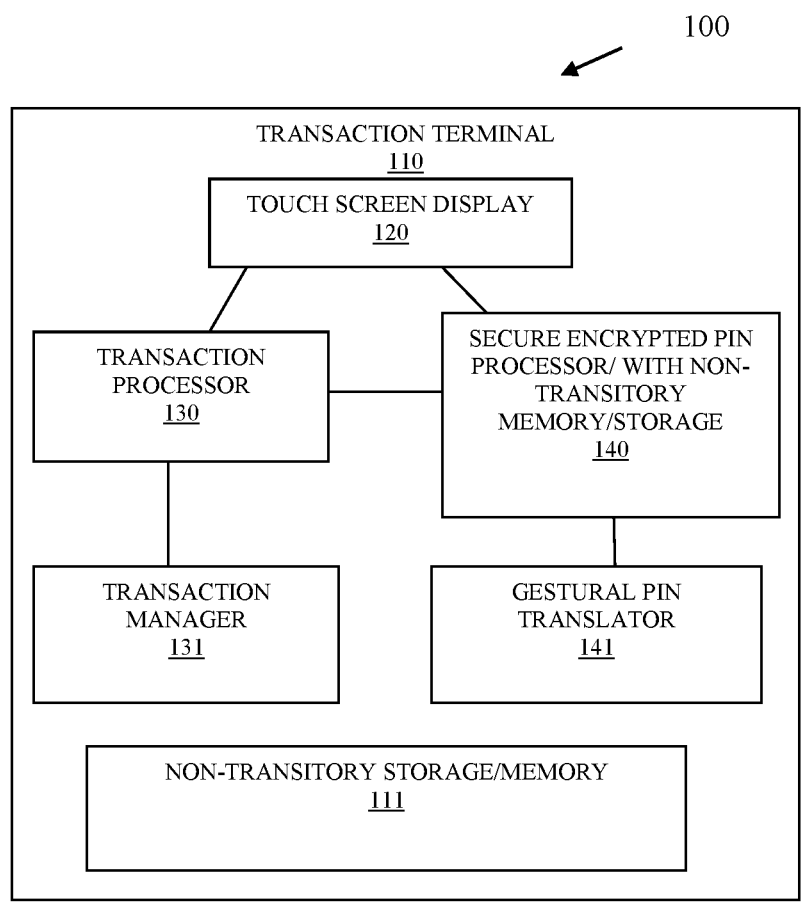
FIG. 1A is a diagram of a system for processing a gestural touch interface on a touch display, according to an example embodiment.

FIG. 1A is a diagram of a system 100 for processing a gestural touch interface on a touch display, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of processing a gestural touch interface on a touch display presented herein and below.

As will be more completely discussed herein and below, the teachings provide a gestural (gesture-based) touch interface rendered on a touchscreen that permits touch-gestures to be made on a surface of the touchscreen for purposes of providing input keys to another service (such as a transaction service, an authentication service, etc.). The location on the surface of the touchscreen that is touched at the start of each gesture-based touch is irrelevant, each such initial touch is assumed to begin at a reference key location associated with a reference key. Each gesture-based touch is identified when the user releases contact from the surface of the touchscreen (e.g., lifts finger off the surface to break contact with the surface), and each gesture-based touch is determined based on the number and types of movements made in a vertical and/or horizontal direction. If there are no movements made in any direction from the point of initial contact until release (lift) of the finger, then this is considered to be associated with the reference key. This allows sight-impaired individuals to more easily operate devices using a mental mapping of a known keypad layout or known selection menu layout that includes the reference key and its position relative to other reference keys in the keypad or known selection menu. The sight-impaired individual requires little to no training to fully interact with the gesture-based touch interface because they are already familiar with the known keypad layout or the known selection menu.

The system 100 includes a transaction terminal 110. Transaction terminal 110 includes: a touchscreen display 120, a transaction processor 130 and a secure encrypted PIN processor 140.

Transaction terminal 110 also includes a non-transitory computer-readable storage medium/memory 111 including executable instructions representing a transaction manager 131. Processor 130 execute the executable instructions from the non-transitory computer-readable storage medium 111 while processing transactions performed on transaction terminal 110.

Furthermore, transaction terminal 110 includes a secure non-transitory computer-readable storage medium/memory 140 accessible to the secure processor 140. The secure medium/memory 140 including executable instructions representing a gestural PIN translator 141 and for performing cryptographic operations (including encryption). Secure processor 140 executes the gestural PIN translator 141 and the cryptographic operations from the secure medium/memory 140.

During a transaction being processed on terminal 110, the transaction manager 131 raises an event indicating that a secure PIN is required to be entered to continue with the transaction on terminal 110. This causes processor 130 to send a message to secure processor 140 requesting a PIN value. Secure processor 140 then takes processing control over the touch screen display 120, this prevents the transaction processor 130 from being able to access or read any display buffers associated with the touch-screen display 120. In this way, a user can enter a PIN using an encrypted and secure mechanism on the same touch screen display 120 that was being used to conduct the transaction and any software that may have been corrupted on terminal 110 is unable to decipher the actual PIN entry that is being entered through touch screen display 120 while secure processor 140 has operating control over display 120.

The Gestural PIN translator 141 is initiated for processing by secure processor 140 when secure processor 140 detects that a headphone cord is inserted into a headphone/speaker jack/port at the terminal 110. Note that this check may not be needed by secure processor 140 if transaction processor 130 indicates with the event that a PIN is being requested where the headphone is already inserted into the jack. The presence of the headphone connection indicates that a sight-impaired individual is performing a transaction at terminal 110. This also triggers audio feedback processing supplied as audio through the headphones by both transaction processor 130 and secure processor 140 (when secure processor has exclusive control for PIN entry at terminal 110).

If there is no indication of any connected headphone at terminal 110, then gestural pin translator 141 (or a different software module associated with the processing environment of secure processor 140) renders a numerical keypad on the touchscreen 120. Touch data/events that correspond to numbers on the rendered numerical keypad are translated into numbers. Typically, the numbers are custom encrypted with a transaction identifier hash and provided as an encrypted PIN value back to the transaction manager 131 of transaction processor 130. Secure processor 140 then relinquishes operating/processing control of touchscreen 120 back to transaction processor 130 to continue transaction processing with the encrypted PIN value.

Gestural PIN translator 141, when activated by secure processor 140 and when a connected headphone is detected, waits to receive touch data/events from touchscreen 120 as provided by the user for purposes of translating touches provided by the user into number entries for a user's PIN.

Figure 1B:
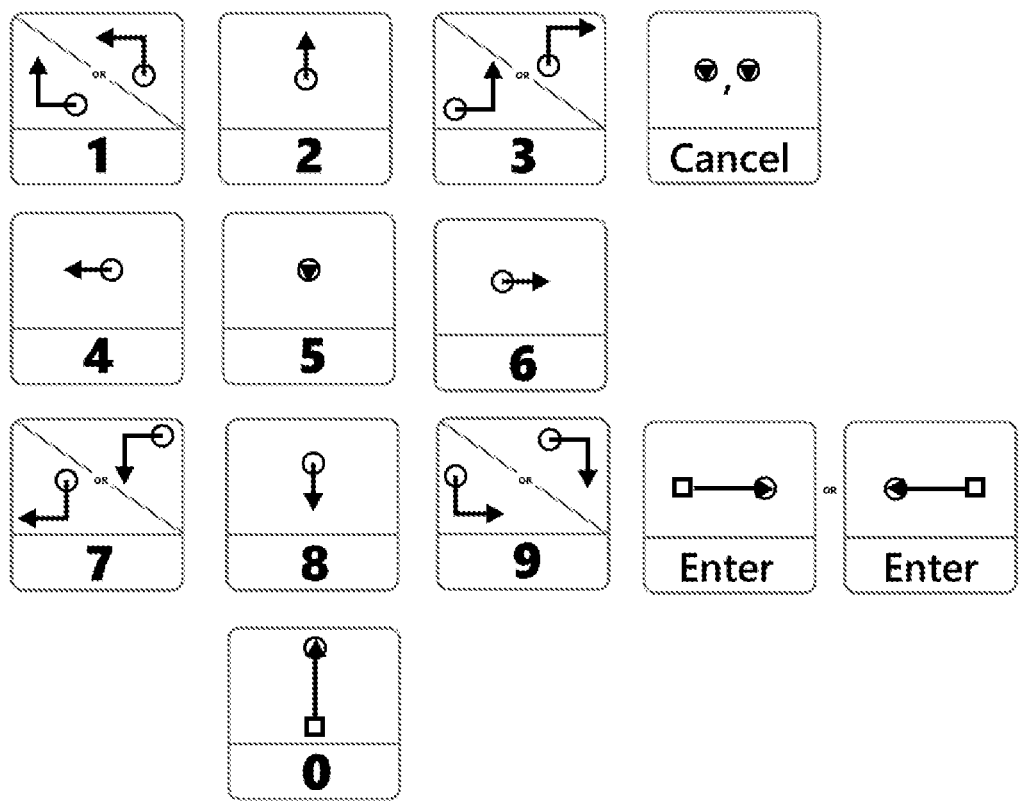
FIG. 1B is an example set of windows illustrating numerical touch-based gestures for a gestural touch interface, according to an example embodiment.

FIG. 1B is an example set of windows illustrating numerical touch-based gestures for a gestural touch interface, according to an example embodiment.

Touch data/events are translated by gestural PIN translator 141 in accordance with the numerical values and corresponding touch movements illustrated in the FIG. 1B. The touch gestures map to a keypad layout such that memorization and complex touch movements are not needed by the sight-impaired individual.

For example, a center of a keypad is a key for the number 5, the corresponding touch recognized by gestural PIN translator 141 for the number 5 is a single pressed point by a user's finger on the surface of touchscreen 120 that is then released (lifted) by the user.

It is to be noted that the location of the single pressed point does not have to be centered within touchscreen 120 and can occur anywhere (such as top left, bottom right, top right, bottom left, off centered, etc.).

It is also to be noted that although the FIG. 1B illustrates a numeric keypad, touchscreen 120 includes no such rendering, in fact, when the user provides the PIN, the touchscreen 120 maybe completely blank with nothing rendered visibly on the touchscreen at all. In an embodiment, it is irrelevant as to whether the touchscreen 120 is rendering any visual information when gestural PIN translator 141 is activated and awaiting a PIN entry; any currently visual information of touchscreen 120 is disregarded by gestural PIN translator 141 as gestural PIN translator 141 waits for entry of gesture-based touches from the user.

According to this particular mapping, which resembles a common keyboard layout, the number 5 serves is chosen to serve as a mental reference point for the user, all other numbers (except the number 0) can be achieved with the touch associated with a 5. The keypad can be visualized by the user by simply knowing that a number 5 is the reference location on a virtual keypad.

Accordingly, using the number 5 as a reference point, a lexicon of gestures can be inferred such that the user can enter a number 1 by making a gesture on the surface of touchscreen 120 as one continuous touch that presses on an initial point (again this initial point can be offset anywhere on the touchscreen surface), maintaining a continuous touch (continuous contact) with the surface of touchscreen 120 and moving to the left and then up or moving up and then to the left, and releasing (lifting finger off the surface) the continuous touch. With 5 as a reference point, there are two paths to reach the 1 key: to the left and up or up and to the left. The number 2 is entered with a gesture-based touch that is pressed on any point of the surface of touchscreen 120, moves up, and is released. The number 3 is entered with a gesture-based touch that is pressed, moved to the right, moved up, and released; or pressed, moved up, moved to the right, and released. The number 4 is entered with a gesture-based touch that is pressed, moved to the left, and released. The number 5 is entered with a gesture-based touch that is pressed, moved to the right, and released. The number 7 is entered with a gesture-based touch that is pressed, moved to the left, moved down, and released; or pressed, moved down, moved to the left, and released. The number 8 is entered with a gesture-based touch that is pressed, moved down, and released. The number 9 is entered with a gesture-based touch that is pressed, moved down, moved to the right, and released; or pressed, moved to the right, moved down, and released.

To the extent that their gestural combination cannot be inferred easily from their location, three keys in the particular configuration of FIG. 1B are special keys that are defined by gestural PIN translator 141 using a change of direction gesture-based touch movement (represented by the squares in the FIG. 1B). As shown, the number 0 (zero) is a gesture-based touch that is pressed, moved down, then moved up and released (lifted). The enter key is a gesture-based touch that can be entered in one of two manners: a press of the finger on any point of the touchscreen 120 that is then moved to the left, moved to the right, and released (lifted); or a press of the finger on any point of touchscreen 120 that is then moved to the right, moved to the left, and released. A cancel key is a gesture-based touch that is a double tap on any point of touchscreen 120. In order to ensure that the cancel key entry is not mistaken for two separate entries for the 5 key, a timer can be set following detection of the first tap and when the second tap is received within a threshold time (very short period of time), the cancel key entry is assumed as opposed to identifying two entries of a 5 key.

In an embodiment, two cancel keys entered in succession (2 double taps back to back) causes the transaction terminal 110 or SST 110 to cancel any user-ongoing transaction and returns any bank card that may be inserted into a card reader of the SST 110.

As the user makes the gesture-based touches for entering a number value (1-9) or key value (0, enter, cancel), the gestural PIN translator 141 provides audio based feedback to the user through the connected headphone. For example, a short beep, a long beep, beeps with patterns, different toned beeps, different pitched beeps, etc.

In an embodiment, the audio-based feedback provides instructions to the user when it is detected that a user is using the gesture-based touch processing for a first time through the connected headphones. The speech messages inform the user that the instructions will loop until the user double taps anywhere on the touchscreen 120. When the user double taps, the speech-based feedback tells the user it is ready to receive PIN input on the touchscreen 120. In an embodiment, instructions played through headphones includes the following:

"Image the layout of a telephone number pad where the numbers 1, 2, and 3 are on a top row; 4, 5, and 6 are on a middle row; 7, 8, and 9 are on a bottom row; and 0 is below 8. To use the gesture-based PIN input, you need to understand the difference between finding a number and entering a number. Finding a number is moving your finger to it but not entering it. After you find a number, it will be entered if you lift your finger off the screen. You will hear a low tone when you first touch the screen and a high tone when you enter a number. You will not however hear any sounds as you move your finger around the screen. When you first touch the screen, your finger will be on the 5 button. It does not matter where on the screen you touch: the system will help you by putting the 5 button wherever you first touch. Think of this as finding the 5. To enter a 5, first find it by touching anywhere on the screen, then enter it by lifting your finger off the screen without moving it around. To enter a different number, you need to find it by moving your finger to its position from the 5. Always start by finding the 5 and then, while keeping your finger on the screen move to the number you want before lifting your finger off the screen to enter it. For example, to enter 1 you must first touch the screen to find the 5. Do not lift your finger yet. Keeping your finger on the screen, move it up in a straight line to where the 2 would be. You have now found the 2. Now move your finger left to where the 1 would be. You have now found the 1. To enter, lift your finger off the screen now. To enter a number 2, touch the screen to find the 5. Keep your finger on the glass. Move your finger up to where the 2 is. You have found the 2, so lift your finger off the screen to enter it. To enter a 3, touch the screen to find the 5. Keep your finger on the glass. Move your finger up to where the 2 is to find the 2. Move your finger to the right to find the 3. Now lift your finger to enter a 3. Enter other numbers using the same method. In each case move your finger to the position where the number would be found on a telephone number pad. 0 requires a special movement. To enter a 0, first touch the screen to focus the 5. Move your finger down. Keeping your finger on the glass move it up again back to the 5. Now lift your finger and you will enter a 0. If you make a mistake you can clear and start again by double tapping anywhere on the screen. To enter a completed PIN number, touch the screen and move your finger to the right. Without lifting, move your finger back to the left. Now lift your finger to enter the completed PIN. It does not matter how big your finger movements are but you need to keep your finger pressed to the glass while you make them and you need to make horizontal and vertical movements only. Diagonal movements are not used. These instructions are now complete and will play again."

In an embodiment, only tones or beeps and non-speech-based feedback is provided over the headphones when the user is entering PIN key values using the touch-based gestures. This is done for security and to prevent any eavesdroppers from hearing PIN key values. This is similar to displaying asterisks (*'s) in a touchscreen when a user enters a password or PIN, the asterisks provide a visual feedback that something was entered but does not display what was actually entered. In this way, the PIN is not exposed through any speech-based feedback upon entry by the user.

Once the user has completed all gesture-based touches for PIN entry and provided the gesture-based touch for entry, the secure processor 140 receives a numerical value for the PIN entry, performs encryption on the numerical value using a transaction specific hash, and provides the encrypted PIN back to the transaction processor 130 where it is provided to the transaction manager 131 for validation with an appropriate financial institution and continued transaction processing.

The gesture-based touches represent gestures that would map to a keypad (if a keypad were available). Thus, a user does not have to memorize the gesture-based touches except for the three special keys (0, enter, and cancel) because a logical mental map of a keyboard is all the user needs and then the user simply makes gestures that correspond to a path for reaching a given number (1-9) using the user's initial point of contact on the touchscreen surface as a point representing the number 5 key. This provides an intuitive interface that would only entail memorizing three special keys (0, enter, and cancel). The memorization is minimal because once the user knows a change of direction (vertical y-axis for 0 (zero) and horizontal (horizontal (x-axis)) or double tapped touch (cancel key) is needed with the gesture-based touch for these three special keys, the user simply changes direction and make a path either from that key to the 5 key or from the 5 key to that key. The 0 (zero) key and the enter key are still logically laid out with the specialized gesture-based touches to map to where these keys would be on a keypad, if such keypad were rendered on touchscreen 120; such that only a double tap for the cancel key requires user memorization.

The gestural PIN translator 141 recognizes the initial point of contact for a gesture-based touch as representing the 5 key and the user visualizes the 5 key as the initial touch, if the user does not want to enter a 5 key, the user makes a continuous touch drawing a path from the 5 key to the key the user wants to enter and then releases the touch. This maps to how users visualize a keypad. The scale and length of the continuous touch movements do not alter the accuracy of the gestural PIN translator 141 in determining an entered key; rather, the gestural PIN translator 141 assumes on first contact the user is at a 5 key, such that a short move to the left with a long move upward is still the 1 key (or vice versa). The user can determine the scale and length desired, the gestural PIN translator 141 looks for a continuous touch and the directional changes noted when the continuous touch is released. Gestural PIN translator 141 is only recognizing the directions of continuous touch encountered once released by the user. Four types of directional movements are recognized: left, right, up, and down. A given single gesture-based touch has at most two directional movements along an x-axis and/or y-axis. Each of the three specialized keys have two directional movements along a same axis (x-axis for enter key and cancel key, and y-axis for zero (0) key). There are only two keys that entail no directional movements, the reference 5 key and the double tapped touches for the cancel key.

Because the user determines the size of the gestural-based touches, users concerned with onlookers can make very small gestural-based touches without effecting the accuracy of gestural PIN translator 141 in recognizing the PIN key entries supplied by the user.

Additionally, users with some sight often have security concerns about excessively sized keypads rendered on screens for PIN entry. Such users can use the gesture-based PIN entry approaches here without any security concerns and without having to produce a large font rendering of any keypad on a display.

In an embodiment, a "gesture-based touch" refers to a single touch that maintains contact with a surface of a touchscreen 120 and is released after no directional change in touch movement is detected (e.g., the key 5) or a double tap of two touches (e.g., cancel key); or is released after one or two directional changes in touch movement is detected. Any two directional changes can be any size/length of movement for the touch along a same axis (e.g., 0 (zero) key or enter key) or a different axis (for both x-axis and y-axis, e.g., 1, 3, 7, and 9 keys). Single directional changes (movement in a single direction from the initial point of contact) include the 2, 4, 6, and 8 keys. A single touch and release includes no directional change and is recognized as a 5 key and is the point of reference for keys 1-4 and 6-9. Two successive touch and releases is recognized as a cancel key. The magnitude (length) of any touch movement made in any direction is irrelevant; rather, the changes in direction (if any) are considered when resolving the gestural inputs.

In an embodiment, an initial rendered keypad is provided by secure processor 140 when secure processor 140 takes over control for encrypted PIN entry from transaction processor 130. A single double touch anywhere on touchscreen 120 removes the rendering of the keypad and activates gestural PIN translator 141 for the gesture-based encrypted PIN entry.

In an embodiment, a whited out screen is presented on touchscreen 120 when gestural PIN translator 141 is activated for encrypted gesture-based PIN entry and remains until either entry is canceled or a PIN is received, at which time transaction processor 130 regains processing control of touchscreen 120 for completing the transaction processing.

In an embodiment, transaction processor 130 may execute a second instance of gestural PIN translator 141 within the processing space of transaction manager 131. This is done independent of the gestural PIN translator 141 executed by the secure processor 140. So, the entire transaction from start to finish can be performed by the user through the aforementioned gesture-based touches. For example, a sight impaired user approaches an ATM (a type of transaction terminal 110) and inserts the user's card and inserts a headphone cord into a headphone jack/port of the ATM. The transaction manager 110 then communicates with the user through speech, asking the user to select a type of transaction as 1 for deposit, 2 for withdrawal, or 3 for account balance. The user double taps anywhere on the surface of touchscreen 120 and the second instance of the gestural PIN translator 141 is activated within the transaction processing space controlled by transaction processor 130. Any visual data previously rendered on the touchscreen 120 is removed. The user makes a gesture-based touch for selection number 2, the second instance of the gestural PIN translator 141 communicates the 2 selection to transaction manager 131. The audio feedback then requests that the user select an account for the withdrawal by communicating through speech, select 1 for checking or 2 for savings. The user makes a gesture-based touch on the touchscreen surface for the number 1, the second instance of the gestural PIN translator 141 communicates to the transaction manager 131. Transaction manager 131 raises an event to activate secure processor 140, touchscreen 120 control is passed from transaction processor 130 to secure processor 140. The secure instance of gestural PIN translator 141 is activated, the user enters the gesture-based touches, and secure instance of the gestural PIN translator 141 provides the numerical value back to secure processor 140. Secure processor 140 performs transaction-specific encryption and provides an encrypted PIN value back to secure processor 130 and then relinquishes control of touchscreen 120 back to transaction processor 130. Transaction manager 131 provides the encrypted PIN to the financial institution over a network switch along with the transaction details (such as withdrawal of $100 from account X with encrypted PIN value Y). Assuming the financial institution approves of the transaction, an encrypted nonce is sent back to transaction manager 131 over the network switch from the financial institution. Transaction manager 131 provides the encrypted nonce to a cash dispenser, the cash dispenser validates the encrypted nonce, activates the safe, and dispenses the cash. Audio feedback tells the user to remove the cash. Speech can be used to see if the user wants to continue with another transaction or is completed, if the user wants to continue the second instance of the gestural PIN translator 141 is used for whatever input is needed form the user for another transaction.

In an embodiment, the transaction terminal 110 is one of: an ATM, a Self-Service Terminal (SST), and a Point-Of-Sale (POS) terminal.

In an embodiment, gestural PIN translator 141 can be executed on a device other than a transaction terminal 110 for other purposes of receiving input from a sight-impaired individual. For example, the device can be a tablet/phone where a numeric input is required from the user, such as a PIN or passcode (to unlock the device), a currency amount, etc. The tablet/phone can be operated by a clerk interacting with the user or be a tablet/phoned operated by the sight-impaired individual.

In an embodiment, secure processor 140 and gestural PIN translator 141 are processed on a transaction terminal 110 that lacks an encrypted PIN pad.

In an embodiment, secure processor 140 and gestural PIN translator 141 are processed on a transaction terminal 110 that includes an encrypted PIN pad but gestural PIN translator 141 replaces functionality of the encrypted PIN pad when gestural PIN translator 141 is activated. That is, the encrypted PIN pad is deactivated by secure processor 140 when secure processor 140 receives an event that causes secure processor to activate gestural PIN translator 141.

In an embodiment, touchscreen display 120 does not include and lacks any tactile-based screen overlay or haptic (vibrational or air-based) feedback capabilities.

In an embodiment, any visual model can be used with a starting reference point to track the paths from the reference point to a given character or selection. That is, the discussion above utilized a keypad layout model with 5 being a reference starting point and the gesture-based touches being paths from the initial reference point of 5 based on 5's location within keypad layout model relative to other keys. So, any specialized adding machine/keyboard layouts or even interface selection items can be used with a known reference starting location and each touch-based gesture representing a path from the reference starting location to the desired key/item or selection within the visual model.

In an embodiment, insertion of headphone connection into an audio post/jack of terminal 110 activates gestural PIN translator 141 and speech-driven audio feedback. In an embodiment, gestural PIN translator 141 is activated after a user is instructed following insertion of the headphone cord to perform a double tap anywhere on touchscreen 120. In an embodiment, a specialized button or key with tactile features on an existing keypad of the terminal 110 can be pressed to activate gestural PIN translator 141.

These and other embodiments, are now discussed with reference to the FIGS. 2-4.

Figure 2:
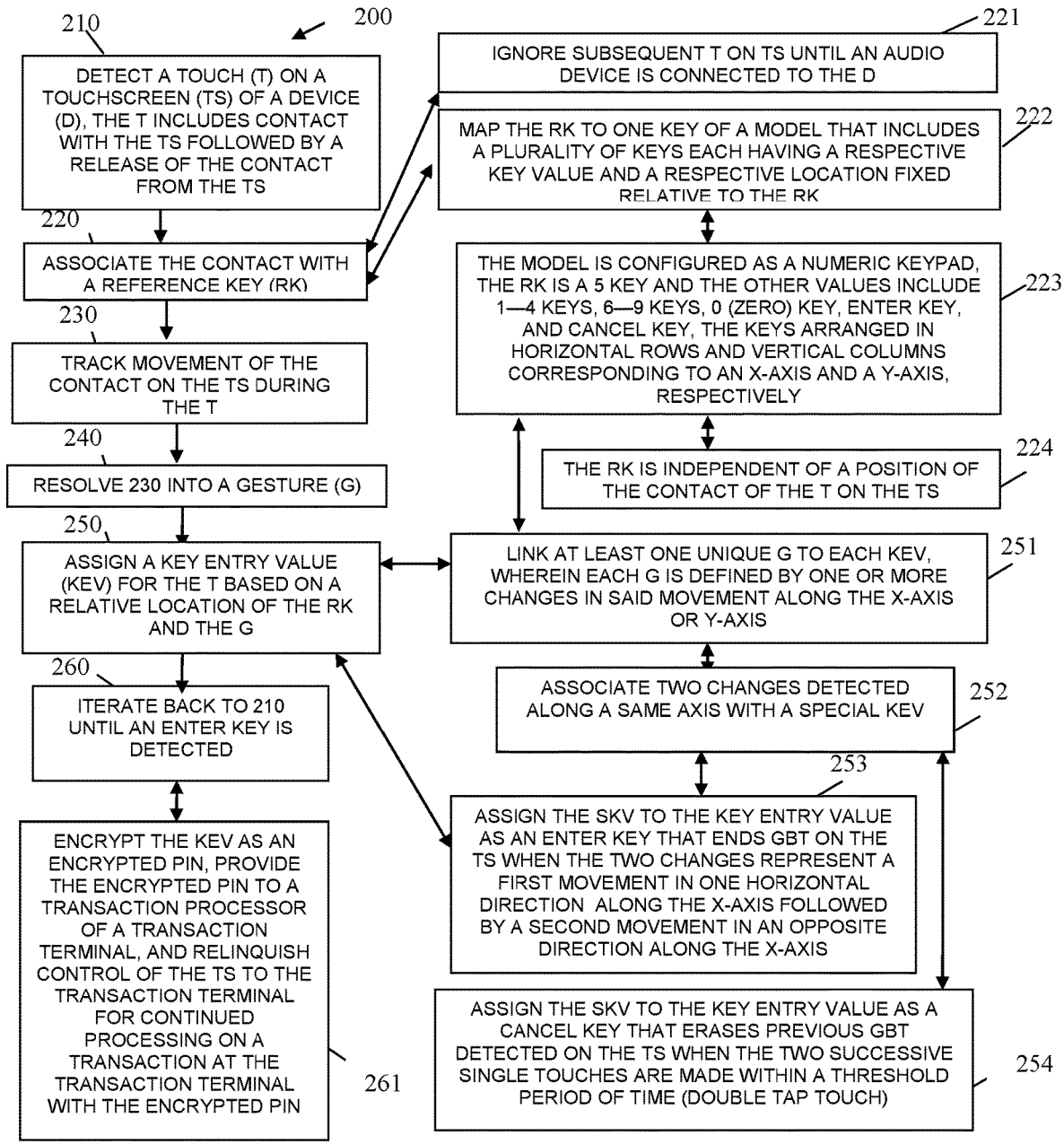
FIG. 2 is a diagram of a method for processing a gestural touch interface on a touch display, according to an example embodiment.

FIG. 2 is a diagram of a method 200 for processing a gestural touch interface on a touch display, according to an example embodiment. The software module(s) that implements the method 200 is referred to as a "gesture-touch screen manager." The gesture-touch screen manager is implemented as executable instructions programmed and residing within memory and/or a non-transitory computer-readable (processor-readable) storage medium and executed by one or more processors of a device. The processor(s) of the device that executes the gesture-touch screen manager are specifically configured and programmed to process the gesture-touch screen manager. The gesture-touch screen manager may have access to one or more network connections during its processing. The network connections can be wired, wireless, or a combination of wired and wireless.

In an embodiment, the device that executes the gesture-touch screen manager is transaction terminal 110. In an embodiment, the transaction terminal 110 is one of: a SST, a POS terminal, an ATM, and/or a kiosk:

In an embodiment, the device that executes the gesture-touch screen manager is one of: a tablet, a phone, a laptop, a desktop, and a wearable processing.

In an embodiment, the gesture-touch screen manager is the gestural PIN translator 141.

At 210, the gesture-touch screen manager detects a touch on a touchscreen of a device. The touch comprises contact with the touchscreen followed by a release of the contact from the touchscreen.

At 220, the gesture-touch screen manager associates the contact with a reference key. That is as soon as a finger touches a surface of the touchscreen, the gesture-touch screen manager recognizes the touch as the reference key (e.g., in the above example of the FIGS. 1A-1B, the reference value is the 5 key on a logical/virtual keypad).

In an embodiment, at 221, the gesture-touch screen manager ignores subsequent touches until an audio device is detected as being connected to the device. The connection to the audio device can be made by detecting a headphone inserted into a headphone port of the device that processes the gesture-touch screen manager. In another case, the connection to the audio device can be made by detecting a wireless connection made wireless connected device that changes the audio output of the device to the wireless connected device. In an embodiment, the gesture-touch screen manager continues to ignore the other touches after detection of a connected audio device until the user performs a double tapped touch (two touches performed within a short threshold period of time).

In an embodiment of 221 and at 222, the gesture-touch screen manager maps the reference key of a model that includes a plurality of keys, each key having a respective key value and respective location fixed relative to the reference key.

In an embodiment of 222 and at 223, the gesture-touch screen manager provides the mode as a numeric keypad. The reference key is a 5 key and other values include 1-4 keys, 6-9 keys, 0 (zero) key, enter key, and cancel key. The keys are arranged in horizontal rows and vertical columns corresponding to an x-axis and a y-axis, respectively.

In an embodiment, of 223, at 224, the gesture-touch screen manager provides the reference key such that the reference key is independent of a position of initial contact of the touch on the touchscreen.

At 230, the gesture-touch screen manager tracks movement of the contact on the touchscreen during the touch.

At 240, the gesture-touch screen manager resolves the touch from 230 into a gesture.

At 250, the gesture-touch screen manager assigns a key entry value for the touch based on a relative location of the reference key and the gesture.

In an embodiment of 222 and 230, at 251, the gesture-touch screen manager links at least one unique gesture to each key value. Each gesture is defined by one or more changes in said movement along the x-axis or the y-axis.

In an embodiment of 251 and at 252, the gesture-touch screen manager associated two changes detected along a same axis with a special key entry value.

In an embodiment of 252 and at 253, the gesture-touch screen manager assigns the special key entry value to the key entry value as an enter key. Processing ends for detection on the gesture-based touches (gestures) upon detection of an entered enter key. The enter key is recognized when the two changes represent an initial movement in one horizontal direction to the left along the x-axis followed by a last (second) movement in direction to an opposite horizontal direction along the x-axis.

In an embodiment of 252 and at 254, the gesture-touch screen manager assigns the special key entry value as a cancel key that erases previous detected gesture-based touches made on the touchscreen. The cancel key is recognized when the two successive single touches made within a threshold period of time (a double tap touch).

According to an embodiment, at 260, the gesture-touch screen manager iterates back to 210 until an enter key is detected within a given gesture-based touch, which provides an indication that a PIN has been completely entered by a user touching the touchscreen with the gesture-based touches.

In an embodiment of 260, and at 261, the gesture-touch screen manager encrypts the key entry value as an encrypted PIN, provides the encrypted PIN to a transaction processor of a transaction terminal, and relinquishes control of the touchscreen to the transaction terminal for continued processing on a transaction at the transaction terminal with the encrypted PIN.

Figure 3:
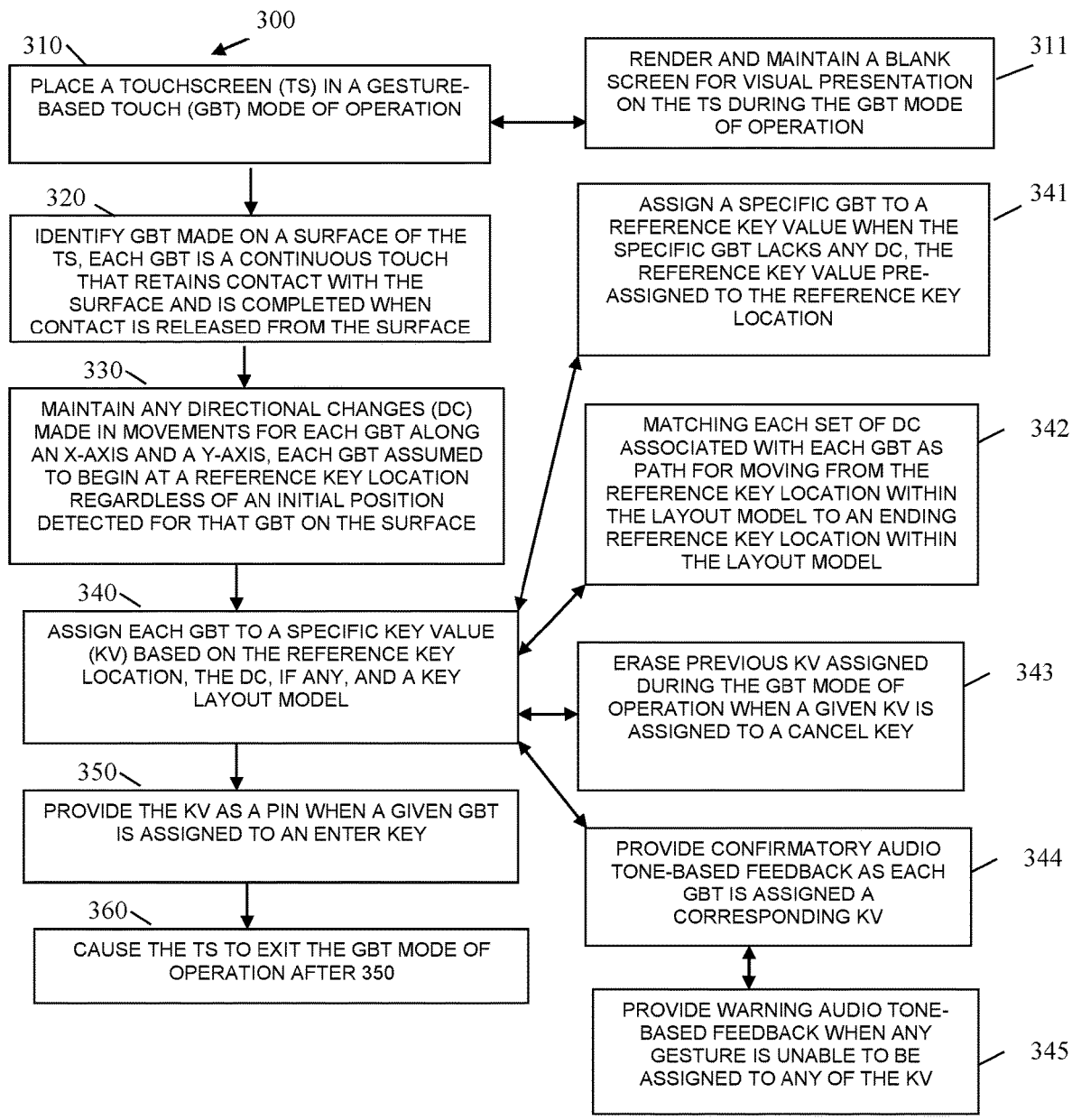
FIG. 3 is a diagram of another method for processing a gestural touch interface on a touch display, according to an example embodiment.

FIG. 3 is a diagram of another method 300 for processing a gestural touch interface on a touch display, according to an example embodiment. The software module(s) that implements the method 300 is referred to as a "touch-based gesture recognizer." The touch-based gesture recognizer is implemented as executable instructions programmed and residing within memory and/or a non-transitory computer-readable (processor-readable) storage medium and executed by one or more processors of a device. The processors that execute the touch-based gesture recognizer are specifically configured and programmed to process the touch-based gesture recognizer. The touch-based gesture recognizer may have access to one or more network connections during its processing. The network connections can be wired, wireless, or a combination of wired and wireless.

In an embodiment, the device that executes the touch-based gesture recognizer is the transaction terminal 110. In an embodiment, the transaction terminal 110 is one of: a SST, a POS terminal, an ATM, and/or a kiosk.

In an embodiment, the device that executes the touch-based gesture recognizer is one of: a table, a phone, a laptop, a desktop, and a wearable processing device.

In an embodiment, the touch-based gesture recognizer is all of some combination of: gestural PIN translator 141 and/or the method 200.

In an embodiment, the touch-based gesture recognizer presents another and in some ways enhanced processing perspective from that which was shown in the method 200 of the FIG. 2.

At 310, the touch-based gesture recognizer places a touchscreen in a gesture-based mode of operation. This can be secure mode or non-secure mode and processed by a non-secure processor or a secure processor as discussed above with the FIGS. 1A-1B. In an embodiment, the touch-based gesture recognizer is places the touchscreen in the gesture-based mode of operation upon detection of a connected audio device made to the device/terminal that executes the touch-based gesture recognizer. This can be a wired headphone connection or can be wireless connection where the speaker output is being wirelessly sent to a wirelessly connected device.

In an embodiment, at 311, the touch-based gesture recognizer renders and maintains a blank screen for visual presentation on the touchscreen during that gesture-based mode of operation. That is, there is no visual data presented on the touchscreen while the touchscreen is in the gesture-based mode of operation. Alternatively, visual data may be presented but it is completely ignored while the touchscreen is in the gesture-based mode of operation.

At 320, the touch-based gesture recognizer identifies gesture-based touches made on a surface of the touchscreen, each gesture-based touch is a continuous touch that retains contact with the surface of the touchscreen and is considered to be completed when contact is released (finger is lifted) from the surface.

At 330, the touch-based gesture recognizer maintains any directional changes made in movements for each gesture-based touch along an x-axis and a y-axis. Each gesture-based touch is assumed to begin at a reference key location regardless of an initial position detected for that gesture-based touch on the surface. That is, the user can place his/her finger at any position on the surface of the touchscreen and initial contact is assumed to be the reference key location. The positions touched by the finger on the touchscreen's surface can changed with each separate gesture-based touch. Each gesture-based touch is assumed to being at the reference key location.

At 340, the touch-based gesture recognizer assigns each gesture-based touch to a specific key value based on the reference key location, the directional changes in movements, if any, and a key layout model.

In an embodiment, at 341, the touch-based gesture recognizer assigns each specific gesture-based touch to a reference key value when the specific gesture-based touch lacks any directional change in movements. Here, the user touches the surface of the touchscreen and removes his finger with no continuous contact with the surface accompanied by any movements along the x-axis or y-axis (there is also no detection of a second touch within a short period of time, which would be recognized as a cancel key). The length of time that the user maintains contact with the surface is irrelevant, such that a press and hold and then release is still associated with the reference key location; however, if the length of time is very short and immediately followed by a second single touch then the touch-based gesture recognizer identifies this as a cancel key being entered.

In an embodiment, at 342, the touch-based gesture recognizer matches each set of direction changes in movements associated with each gesture-based touch as a path for moving from the reference key location within the layout model to an ending key location within the layout model. The length of each drawn line along the x-axis and the y-axis is also irrelevant; rather it is simply the movement detected along the x-axis and/or y-axis and the number of different movements on the two axis.

In an embodiment, at 343, the touch-based gesture recognizer erases previous specific key values assigned during the gesture-based mode of operation when the given special key value is assigned to a cancel key.

In an embodiment, at 344, the touch-based gesture recognizer provides confirmatory audio tone-based feedback as each gesture-based touch is assigned a corresponding specific key value.

In an embodiment of 344 and at 345, the touch-based gesture recognizer provides warning audio tone-based feedback when any gesture is unable to be assigned to any of the specific key values. This allows the user to try again.

At 350, the touch-based gesture recognizer provides the specific key values as a PIN when a given gesture-based touch is assigned to an enter key.

At 360, the touch-based gesture recognizer causes the touchscreen to exit the gesture-based touch mode of operation after 350. That is, if the touch-based gesture recognizer is being processed on a device through a secure processor that is separate from a transaction processor, the touch-based gesture recognizer relinquishes control of the touchscreen back to the transaction processor. A different interface may then be rendered on the screen or alternatively another instance of the touch-based gesture recognizer may initiated for continued gesture-based processing on the device.

Figure 4:
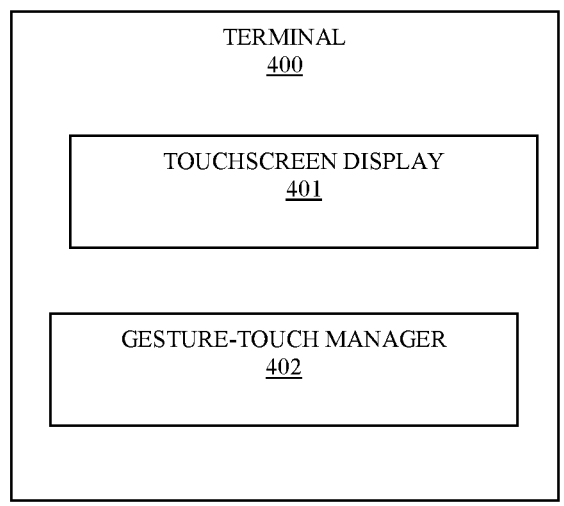
FIG. 4 is a diagram of a transaction terminal for processing a gestural touch interface on a touch display, according to an example embodiment.

FIG. 4 is a diagram of a terminal 400 for processing a gestural touch interface on a touch display, according to an example embodiment. The terminal 400 includes a variety of hardware components and software components. The software components of the terminal 400 are programmed and reside within memory and/or a non-transitory computer-readable medium and execute on one or more processors of the terminal 400. The terminal 400 may communicate over one or more networks, which can be wired, wireless, or a combination of wired and wireless.

In an embodiment, the terminal 400 implements, inter alia, the processing described above with the FIGS. 1A-1B and 2-3.

The terminal 400 is the transaction terminal 110.

In an embodiment, the terminal 400 is one of: an ATM, a SST, a POS terminal, a phone, a tablet, a laptop, a desktop computer, and a wearable processing device.

The terminal 400 includes a touchscreen display 401 and a gesture touch manager 402. The terminal 400 also includes at least one hardware processor and non-transitory computer-readable storage medium/memory. The non-transitory computer-readable storage medium/memory includes executable instruction that represent the gesture touch manager 402. The executable instructions executed by the at least one hardware processor of the terminal 400 from the non-transitory computer-readable storage medium/memory.

In an embodiment, the touchscreen display is the touchscreen display 120.

In an embodiment, the gesture-touch manager 402 is all or some combination of the gestural PIN translator 141, the method 200, and/or the method 300.

The gesture-touch manager 402, when executed by the hardware processor of the terminal 400 from the non-transitory computer-readable storage medium, is configured to perform processing to: identify gesture-based touches made on a surface of the touchscreen 401 when a touch contact with the surface is released regardless of initial starting positions for each gesture-based touch made on the surface; assign each gesture-based touch to an input value based on a mapping that associates the starting positions with a single reference input value, and directional movements recorded for each gesture-based touch identifying a path to the corresponding input value from the single reference input value; and provide a set of assigned input values as PIN for a transaction being processed on the terminal 400.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting a touch of a single finger on a touchscreen of a device, the touch comprising a contact with the touchscreen followed by a release of said contact from the touchscreen, wherein detecting the touch further includes detecting the touch even when the touchscreen is presenting visual information;
   associating the contact with a reference key;
   tracking a movement of the contact on the touchscreen during said touch, wherein a length of time of the touch before the release is irrelevant to the tracking of the movement of the touch relative to the reference key in order to resolve the touch into a user-provided key value, and wherein a magnitude of the touch in any direction is irrelevant to the tracking of the movement of the touch relative to the reference key in order to resolve the touch into the user-provided key value;
   resolving the tracking into a gesture that represents the user-provided key value;
   assigning a key entry value for the touch based on a relative location of the reference key and the gesture, wherein when the touch comprised no tracked movement with no magnitude in any direction, the key entry value is assigned to a reference key value associated with the reference key, wherein the key entry value represents the user-provided key value;
   iterating back to the detecting until an enter key is detected, wherein iterating further includes encrypting the key entry value as an encrypted PIN, providing the encrypted PIN to a transaction processor of a transaction terminal, and relinquishing processing control of the touchscreen to the transaction terminal for continued processing on a transaction at the transaction terminal with the encrypted PIN.

2. The method of claim 1, wherein associating further includes ignoring subsequent touches on the touchscreen until an audio device connected to said device is detected.

3. The method of claim 1, wherein associating further comprises mapping the reference key to one key of a model that includes a plurality of keys each having a respective key value and a respective location fixed relative to the reference key.

4. The method of claim 3, wherein the model is configured as a numeric keypad wherein the reference key is a 5 key and the other values include 1-4 keys, 6-9 keys, 0 (zero) key, enter key, and cancel key, the keys arranged in horizontal rows and vertical columns corresponding to an x-axis and a y-axis, respectively.

5. The method of claim 4, wherein mapping the reference key is independent of a position of said contact of the touch on the touchscreen.

6. The method of claim 4, wherein assigning further includes linking at least one unique gesture to each key entry value, wherein each gesture is defined by one or more changes in said movement along the x-axis or y-axis.

7. The method of claim 6, wherein assigning further includes associating two changes detected along a same axis with a special key entry value.

8. The method of claim 7, wherein assigning further includes assigning the special key entry value to the key entry value as an enter key that ends gesture-based touches on the touchscreen when the two changes represent an initial movement made in a first horizontal direction along the x-axis that is followed by a second movement made in an opposite horizontal direction along the x-axis.

9. The method of claim 7, wherein assigning further includes assigning the special key entry value to the key entry value as a cancel key that erases previous gesture-based touches detected on the touchscreen when the two successive touches are detected with no directional changes within a threshold period of time as a double tapped touch.

* * * * *